United States Patent
Lau et al.

(10) Patent No.: US 8,375,186 B2
(45) Date of Patent: *Feb. 12, 2013

(54) SPATIAL EXTENT MIGRATION FOR TIERED STORAGE ARCHITECTURE

(75) Inventors: Pui Fun Lau, Vail, AZ (US); David Montgomery, Costa Mesa, CA (US); Karl A. Nielsen, Tucson, AZ (US); Richard B. Stelmach, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/469,675

(22) Filed: May 11, 2012

(65) Prior Publication Data

US 2012/0226859 A1  Sep. 6, 2012

Related U.S. Application Data

(63) Continuation of application No. 12/942,625, filed on Nov. 9, 2010.

(51) Int. Cl.
*G06F 12/00* (2006.01)
(52) U.S. Cl. ............... 711/165; 711/162; 711/E12.002
(58) Field of Classification Search .................... None
See application file for complete search history.

(56) References Cited

U.S. PATENT DOCUMENTS

| | | | |
|---|---|---|---|
| 7,539,709 | B1 | 5/2009 | Vengerov et al. |
| 7,716,441 | B2 | 5/2010 | Kano et al. |
| 2009/0228655 | A1 | 9/2009 | Yamane |
| 2010/0002240 | A1 | 1/2010 | Benhase et al. |
| 2010/0077168 | A1 | 3/2010 | Arakawa |
| 2010/0274827 | A1* | 10/2010 | Hix et al. ................ 707/813 |
| 2011/0202732 | A1 | 8/2011 | Montgomery |

OTHER PUBLICATIONS

D. Vengerov, "A Reinforcement Learning Framework for Online Data Migration in Hierarchical Storage Systems", The Journal of Supercomputing, vol. 43, Issue 1, Jan. 2008, 3 pp. (includes abstract).
"Hierarchical Storage Management in a Virtualized Storage Environment", IBM Corp., ip.com Prior Art Database, Technical Disclosure, Document No. IPCOM000184268D, Jun. 18, 2009, 3 pp.
"Intelligent Object Placement and Migration on Storage Media with Widely Varying Performance Characteristics", IBM Corp., ip.com Prior Art Database, Technical Disclosure, Document No. IPCOM000190523D, Dec. 3, 2009, 3 pp.
"Multi-Tier Extent Striping for Migration of Hot Data Segments", IBM Corp., ip.com Prior Art Database, Technical Disclosure, Document No. IPCOM000191133D, Dec. 17, 2009, 4 pp.
Preliminary Amendment filed May 11, 2012, pp. 1-5, for US. U.S. Appl. No. 12/942,625, filed Nov. 9, 2010 entitled "Spatial Extent Migration for Tiered Storage Architecture", by inventors P.F. Lau, D. Montgomery, K.A. Nielsen and R.B. Stelmach (18.368).
U.S. Appl. No. 12/942,625, filed Nov. 9, 2010 entitled "Spatial Extent Migration for Tiered Storage Architecture", by inventors P.F. Lau, D. Montgomery, K.A. Nielsen and R.B. Stelmach (18.368), 18 pp.
D. Vengerov, "A Reinforcement Learning Framework for Online Data Migration in Hierarchical Storage Systems", The Journal of Supercomputing, vol. 43, Issue 1, Jan. 2008, pp. 1-19.

* cited by examiner

*Primary Examiner* — Jared Rutz
*Assistant Examiner* — Baboucarr Faal
(74) *Attorney, Agent, or Firm* — Janaki K. Davda; Konrad Raynes Davda & Victor LLP

(57) ABSTRACT

Provided are techniques for migrating a first extent, determining a spatial distance between the first extent and a second extent, determining a ratio of a profiling score of the second extent to the spatial distance, and, in response to determining that the ratio exceeds a threshold, migrating the second extent.

5 Claims, 4 Drawing Sheets

SPATIAL EXTENT MIGRATION FOR TIERED STORAGE ARCHITECTURE

CROSS-REFERENCE TO RELATED APPLICATION

This application is a continuation of U.S. patent application Ser. No. 12/942,625, filed on Nov. 9, 2010, which application is incorporated herein by reference in its entirety.

BACKGROUND

1. Field

Embodiments of the invention relate to spatial extent migration for tiered storage architecture.

2. Description of the Related Art

Tiered-storage architectures refer to systems in which there are different types of storage designated to be in different tiers. For example, the following are examples of tiers of storage:

1—solid state drives
2—enterprise class hard disk drives
3—Serial Advanced Technology Attachment (SATA) or lower performance hard disk drives
4—magnetic tape In current tiered-storage architectures, extents are migrated from tier-to-tier dynamically based-upon Input/Output (I/O) profiling. An extent may be described as a contiguous area of storage in a computer file system that is reserved for a file. A file may be stored in one or more extents. Also, one extent may store multiple files. In current tiered-storage architectures, the extents that are accessed for I/O most frequently are stored in faster access storage (e.g., solid state drives and hard disk drives), while extents that are accessed for I/O less frequently are stored in slower access storage (e.g., SATA and magnetic tapes).

Although the current implementation has a lower performance impact to storage systems and improved Quality Of Service (QOS) during migration because migration is more predictable, the current implementation is not optimal.

Typically, when an I/O threshold is reached, the extents are migrated between tiers of storage, as needed. However, this technique is not optimal as it would be preferred that the extent migration occurred prior to reaching the I/O threshold as performance is impacted by the migration.

Thus, there is a need for improved spatial extent migration for tiered storage architecture.

BRIEF SUMMARY

Provided are a method, computer program product, and system for migrating a first extent, determining a spatial distance between the first extent and a second extent, determining a ratio of a profiling score of the second extent to the spatial distance, and, in response to determining that the ratio exceeds a threshold, migrating the second extent.

BRIEF DESCRIPTION OF THE SEVERAL VIEWS OF THE DRAWINGS

Referring now to the drawings in which like reference numbers represent corresponding parts throughout:

FIG. 2 is formed by FIGS. 2A and 2B.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

Embodiments use a combination of dynamic profiling and spatial locality to determine when to migrate an extent.

Figure 1:
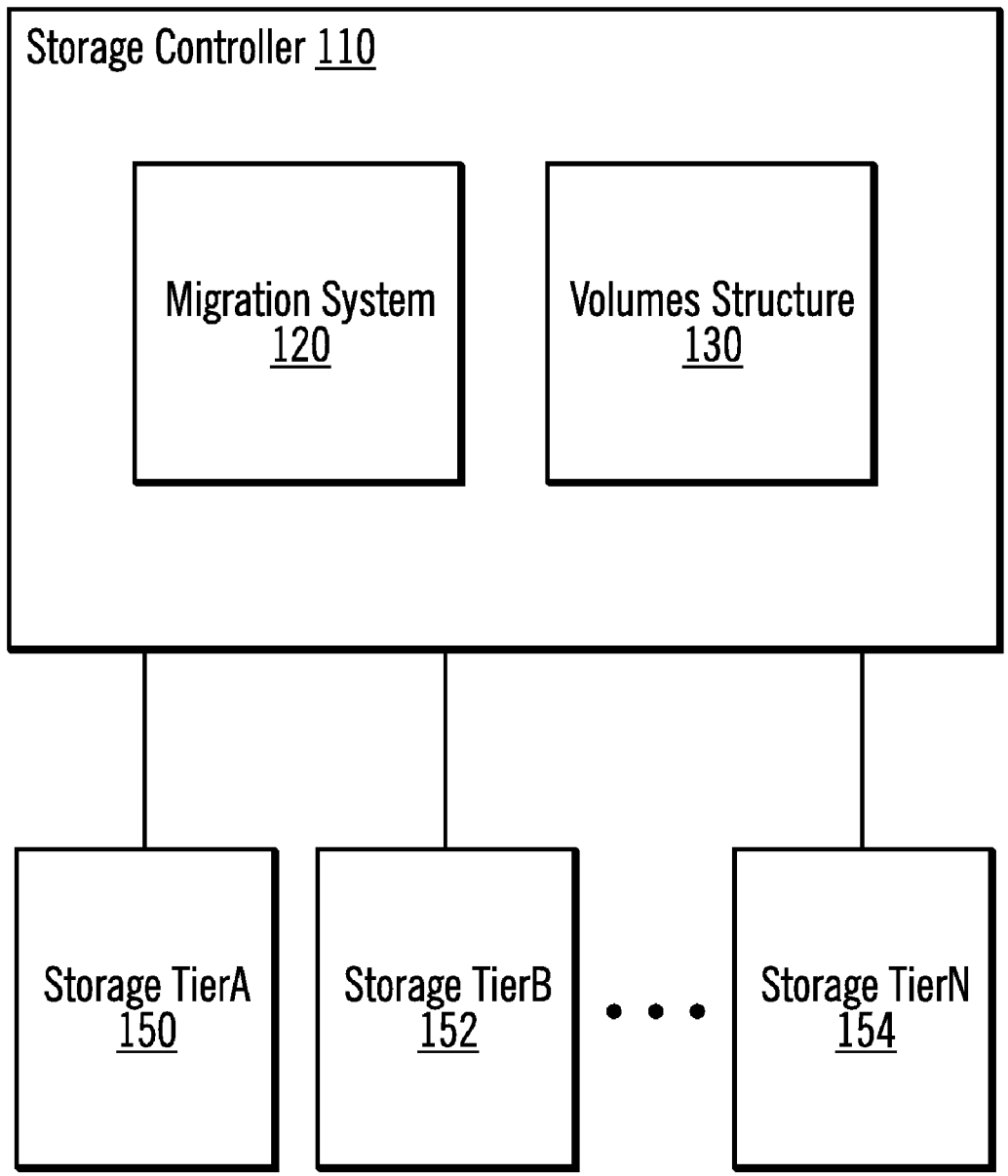
FIG. 1 illustrates, in a block diagram, a computing architecture in accordance with certain embodiments.

FIG. 1 illustrates, in a block diagram, a computing architecture in accordance with certain embodiments. A storage controller 110 includes a migration system 120 and a volumes structure 130. In certain embodiments, the volumes structure 130 is a table.

Volumes may be described as a logical entity. Volumes contain a set of extents. The extents may also be described as logical entities. In addition, an extent has a physical location, as well as a logical position, within a volume. An extent can be thought of as "extent N of volume V" regardless of where the extent physically resides. For example, the first extent of a volume remains the first extent of the volume, even if the extent is migrated between different physical locations. Similarly, the fifth extent of a volume remains the fifth extent of a volume regardless of how many times the extent is migrated between different physical locations.

The storage controller 110 is coupled to storage tierA 150, storage tierB 152, . . . storage tierN. The ellipses indicate that there may be additional storage tiers. Also, though three storage tiers are shown, in various embodiments, any number of storage tiers may be used. The use of suffixes A, B, N also indicate that any number of storage tiers may be used.

Volumes are created from extents in a sequential manner (i.e., a logical order). Using this property, the migration system 120 employs a distance formula to determine spatial proximity of one extent to another extent in an effort to preemptively migrate extents in close proximity to extents that have previously been dynamically migrated (based on I/O profiling). In embodiments, any distance formula may be used. One example of a distance formula is to use the extent's logical position within the volume (e.g., the eighth extent in a volume is six away from the second extent in the same volume.

When a volume is created, the extent boundaries are recorded into the volumes structure 130. This is used to determine, for a given extent, which volume the extent resides in.

Figure 2A:
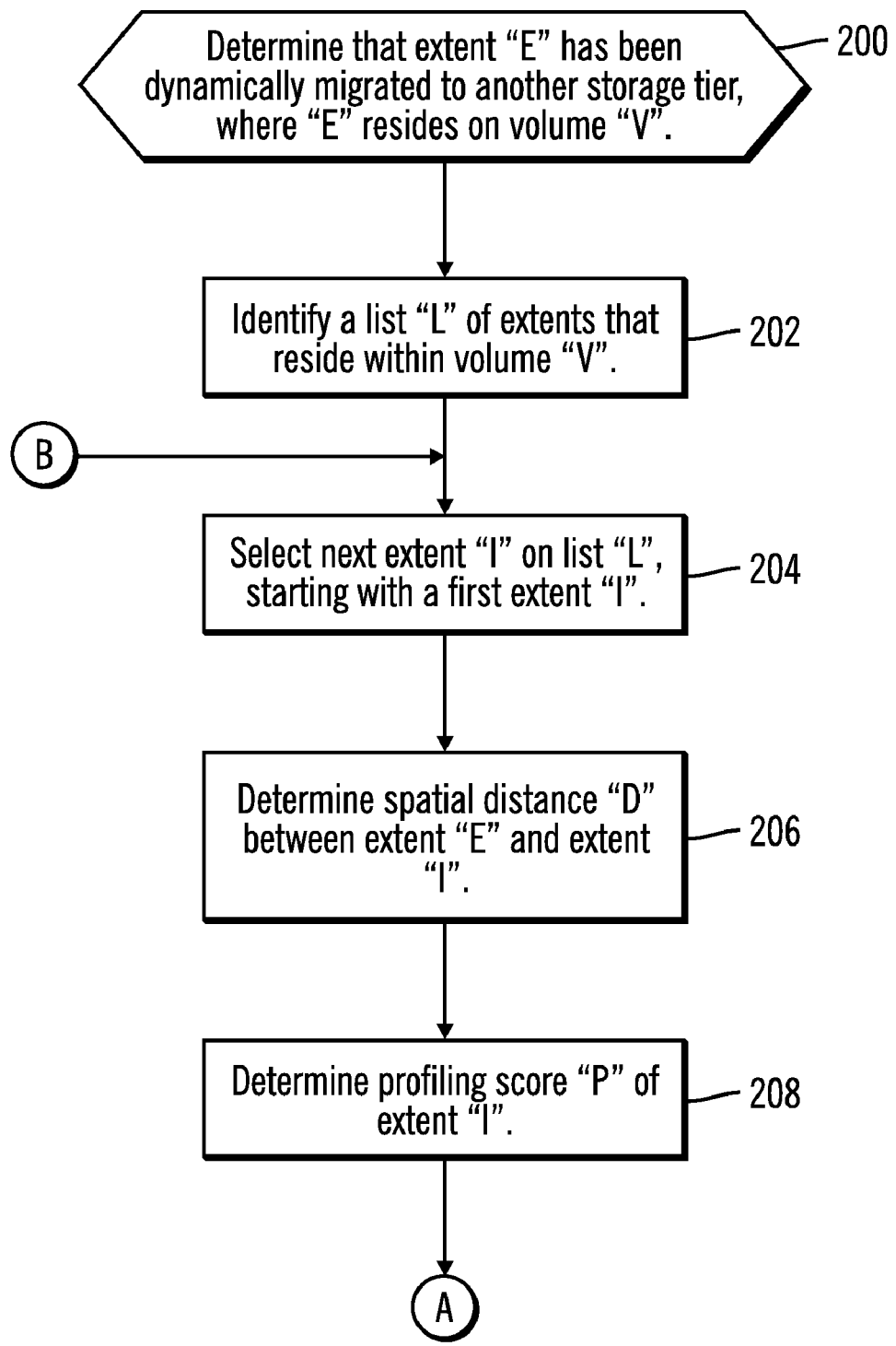
FIG. 2 illustrates, in a flow diagram, logic performed by a migration system in accordance with certain embodiments.
Figure 2B:
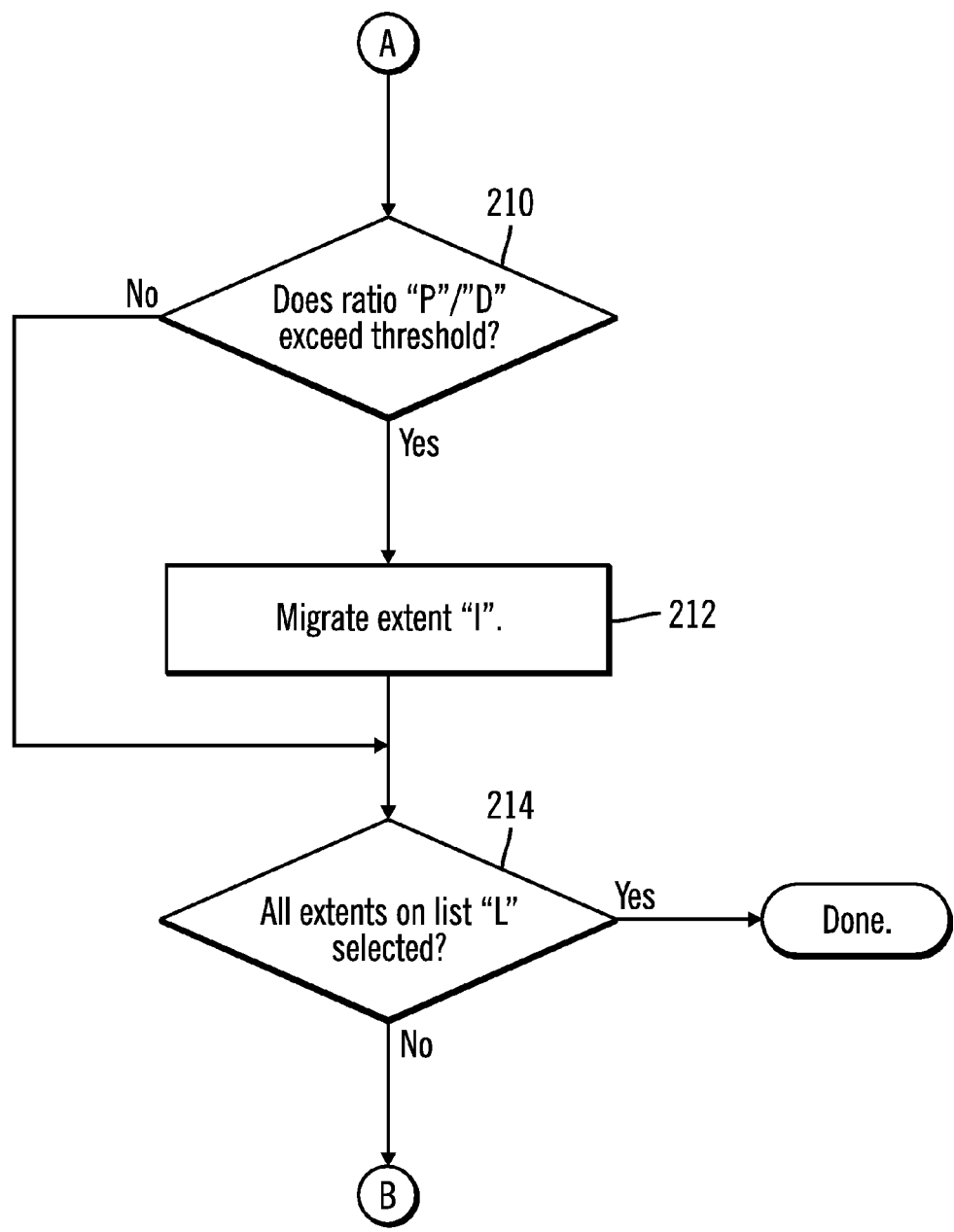

FIG. 2 illustrates, in a block diagram, logic performed by the migration system 120 in accordance with certain embodiments. FIG. 2 is formed by FIGS. 2A and 2B. Control begins at block 200 with the migration system 120 determining that an extent "E" (i.e., a first extent) has been dynamically migrated to another storage tier, where "E" resides on volume "V". In certain embodiments, the extent "E" is dynamically migrated based on a profiling score of extent "E". A profiling score may be described as representing a value of I/O profiling of the extent.

In block 202, the migration system 120 identifies a list "L" of extents that reside within volume "V". In certain embodiments, the list is a subset of the extents on volume V (e.g., based on the spatial distance between an extent on volume V from extent "E" or based on other factors (e.g., whether the extent is already on the storage tier that extent "E" was migrated to and/or hot spot management). In block 204, the migration system 120 selects a next extent "I" on list "L", starting with a first extent "I". The next extent may be a second or subsequent extent. In block 206, the migration system 120 determines a spatial distance "D" between extent "E" and extent "I". In certain embodiments, the spatial distance is determined using the distance formula. In block 208, the migration system 120 determines a profiling score "P" of extent "I". In certain embodiments, the profiling score is based on I/O profiling. That is, an extent that is accessed more often has a higher profiling score than an extent that is accesses less often. In certain embodiments, the profiling score may be based on an average size of the I/O to the extent as well as how often the extent is accessed.

From block 208 (FIG. 2A), processing continues to block 210 (FIG. 2B). In block 210, the migration system 120 determines whether a ratio of the profiling score to the spatial distance (i.e., "P"/"D") exceeds a threshold. If the ratio exceeds the threshold, processing continues to block 212, otherwise, processing continues to block 214.

In certain embodiments, the threshold may be adjusted by an application or user (e.g., system administrator).

In block 212, the migration system 120 migrates extent "I". In certain embodiments, the extent "I" is migrated to the same storage tier as extent "E". In certain embodiments, the extent "I" is migrated to a different storage tier than extent "E". In certain embodiments, the extent "I" is migrated a distance in some direction.

The extent does not move between volumes. The extent stays in the same logical position in the same volume regardless of which storage tier that the extent physically resides on. Multiple extents may exist on a volume, so the data in the extent will exist on the same volume after dynamic migration to a different storage tier. The intent is to move extents near the extent that was dynamically migrated before they need to be accessed. In embodiments, extents in one volume may be physically stored in different storage tiers.

If the ratio does not exceed the threshold, the migration system 120 does not migrate extent "I", and processing continues to block 414.

In block 414, the migration system 120 determines whether all extents on list "L" have been selected. If so, processing is done, otherwise, processing loops back to block 204 (FIG. 2A) to select another extent "I" on the list "L".

Thus, the migration system 120 determines whether to migrate a spatially located extent based-upon the ratio of I/O profiling vs. spatial distance (D). The two variables are a ratio ("P"/"D"), implying that as either the profiling score decreases or the spatial distance increases, the likelihood of the migration for the given extent decreases.

If the ratio produces a value exceeding a predetermined threshold (i.e., high profile score and/or short distance), the extent is migrated. The spatial analysis for other extents can be done either before or after the initial extent "E" has been migrated.

Thus, embodiments utilize spatial properties to provide spatial-predictive migration Additional Embodiment Details As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational processing (e.g., operations or steps) to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations. For example, the migration system may comprise hardware logic or circuitry.

Figure 3:
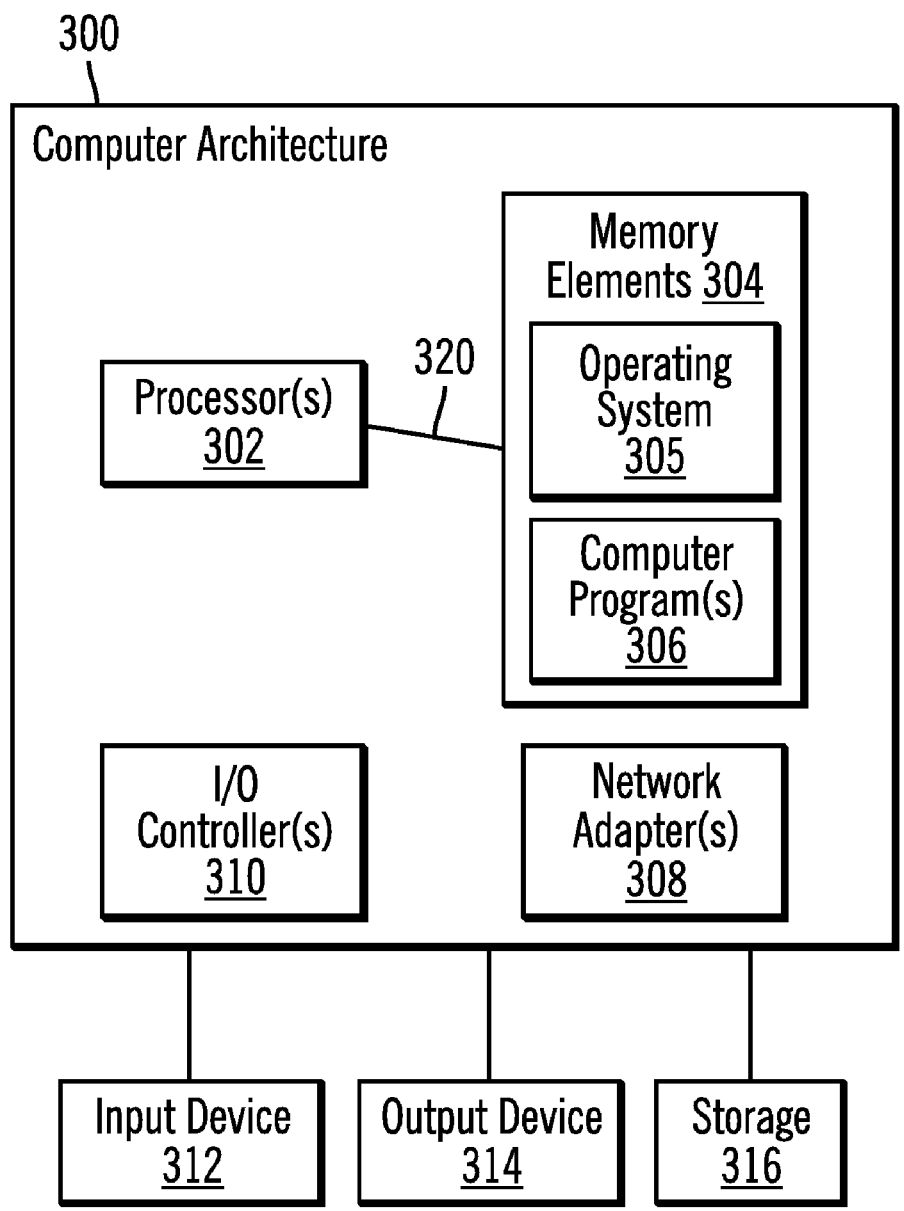
FIG. 3 illustrates, in a block diagram, a computer architecture that may be used in accordance with certain embodiments.

FIG. 3 illustrates a computer architecture 300 that may be used in accordance with certain embodiments. Storage controller 110 may implement computer architecture 300. The computer architecture 300 is suitable for storing and/or executing program code and includes at least one processor 302 coupled directly or indirectly to memory elements 304 through a system bus 320. The memory elements 304 may include local memory employed during actual execution of the program code, bulk storage, and cache memories which provide temporary storage of at least some program code in order to reduce the number of times code must be retrieved from bulk storage during execution. The memory elements 304 include an operating system 305 and one or more computer programs 306.

Input/Output (I/O) devices 312, 314 (including but not limited to keyboards, displays, pointing devices, etc.) may be coupled to the system either directly or through intervening I/O controllers 310.

Network adapters 308 may also be coupled to the system to enable the data processing system to become coupled to other data processing systems or remote printers or storage devices through intervening private or public networks. Modems, cable modem and Ethernet cards are just a few of the currently available types of network adapters 308.

The computer architecture 300 may be coupled to storage 316 (e.g., a non-volatile storage area, such as magnetic disk drives, optical disk drives, a tape drive, etc.). The storage 316 may comprise an internal storage device or an attached or network accessible storage. Computer programs 306 in storage 316 may be loaded into the memory elements 304 and executed by a processor 302 in a manner known in the art.

The computer architecture 300 may include fewer components than illustrated, additional components not illustrated herein, or some combination of the components illustrated and additional components. The computer architecture 300 may comprise any computing device known in the art, such as a mainframe, server, personal computer, workstation, laptop, handheld computer, telephony device, network appliance, virtualization device, storage controller, etc.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

The invention claimed is:

1. A method, comprising:
    dynamically migrating, using a computer including a processor, a first extent from a first storage tier to a second storage tier based on a profiling score of the first extent;
    determining a spatial distance between the first extent and a second extent in the first storage tier, wherein the first extent and the second extent are in a same volume;
    determining a ratio of a profiling score of the second extent to the spatial distance;
        in response to determining that the ratio exceeds a threshold, migrating the second extent.

2. The method of claim 1, further comprising:
    migrating the first extent and the second extent to different storage tiers.

3. The method of claim 1, further comprising:
    migrating the first extent and the second extent to a same storage tier.

4. The method of claim 1, further comprising:
    identifying a list of extents that reside on the same volume as the first extent; and
    determining whether each of the extents on the list should be migrated.

5. The method of claim 1, further comprising:
    in response to determining that the ratio does not exceed the threshold, not migrating the second extent.

* * * * *